United States Patent [19]
Fujii

[11] Patent Number: 5,471,103
[45] Date of Patent: Nov. 28, 1995

[54] MOTOR FOR PROVIDING A VIBRATING ACTION FOR A RADIO PAGER

[75] Inventor: Masahiro Fujii, Tokyo, Japan

[73] Assignee: NEC Corporation, Japan

[21] Appl. No.: 990,597

[22] Filed: Dec. 14, 1992

[30] Foreign Application Priority Data

Dec. 17, 1991 [JP] Japan .................... 3-352971

[51] Int. Cl.⁶ ............................ H02K 7/065; H02K 1/04
[52] U.S. Cl. ............................................. 310/81; 310/43
[58] Field of Search ............................ 310/43, 81, 268, 310/40 MM; 340/311.1, 407

[56] References Cited

U.S. PATENT DOCUMENTS

| | | | |
|---|---|---|---|
| 3,361,130 | 1/1968 | Rowe | 310/81 |
| 3,584,249 | 6/1971 | Murphy | 310/81 |
| 3,993,920 | 11/1976 | Sato | 310/268 |
| 4,303,844 | 12/1981 | Suzuki | 310/268 |
| 4,374,336 | 2/1983 | Shimizu | 310/268 |
| 4,494,026 | 1/1985 | Abe | 310/40 MM |
| 4,763,037 | 8/1988 | Hashimoto et al. | 310/268 |
| 4,864,276 | 9/1989 | Tribbey et al. | 340/407 |

FOREIGN PATENT DOCUMENTS

| | | | |
|---|---|---|---|
| 47-1964 | 1/1972 | Japan | 310/81 |
| 1-129744 | 5/1989 | Japan | 310/181 |
| 2184296 | 6/1987 | United Kingdom | 310/81 |

*Primary Examiner*—Steven L. Stephan
*Assistant Examiner*—C. La Balle
*Attorney, Agent, or Firm*—Laff, Whitesel, Conte & Saret, Ltd.

[57] ABSTRACT

A motor incorporated in a radio pager provides a vibrating action of the type used for alerting the user that he had received a call. A stator is affixed to the bottom of a casing. A rotor is in the form of a disk mounted on and affixed to a rotary a shaft and provided with coils therein. A weight having a sectorial shape is mounted on the top of the rotor in one embodiment and at the center of the coils in another embodiment.

11 Claims, 3 Drawing Sheets

MOTOR FOR PROVIDING A VIBRATING ACTION FOR A RADIO PAGER

BACKGROUND OF THE INVENTION

The present invention relates to a radio pager of the type alerting the user to a call by vibration and, more particularly, to a motor applicable to such a radio pager for providing a vibrating action.

A radio pager is generally provided with alerting means in the form of, for example, a speaker for producing an alert tone or a motor for generating vibration. The motor for providing a vibrating action usually has a casing and a rotor assembly disposed in the casing. The rotor assembly is made up of a rotor partly removed and rotatably mounted on a shaft, and coils mounted on the rotor. The center of gravity of the partly removed motor is eccentric to the shaft. As a result, the center of gravity of the motor changes during the course of rotation to provide a vibrating action. However, removing part of the rotor correspondingly reduces the overall mass of the rotor assembly and, therefore, the change of the center of gravity relative to the shaft during rotation, thereby preventing the motor from generating a sufficient degree of vibration. Further, the removed part of the rotor prevents the coil from having a great number of turns. This not only limits the torque and, therefore, vibration available with the motor but also aggravates current consumption. U.S. Pat. No. 4,864,276 to Tribbey et al discloses a rotor assembly capable of making the center of gravity of the rotor eccentric to the shaft despite that the rotor is implemented as a disk. This rotor assembly is characterized in that one of a plurality of coils mounted on the rotor is smaller in size and weight than the others. However, even with this kind of scheme, it is impossible to achieve a satisfactory degree of vibration.

SUMMARY OF THE INVENTION

It is, therefore, an object of the present invention to provide a motor for a radio pager capable of increasing the mass of a rotor of a rotor assembly, insuring a sufficient number of turns of coils, increasing the torque, and thereby increasing the degree of vibration.

In accordance with the present invention, a rotor assembly of a motor for providing a vibrating action comprises a rotor rotatably mounted on a shaft inside of a casing, and a weight provided in part of the rotor.

Also, in accordance with the present invention, a motor for providing a vibrating action incorporated in a radio pager comprises a casing, a stator affixed inside of the casing and comprising a permanent magnet having a plurality of poles, a rotor rotatably mounted on a shaft inside of the casing while facing the stator and provided with a plurality of coils, and a weight mounted on part of a surface of the rotor.

Further, in accordance with the present invention, a motor for providing a vibrating action incorporated in a radio pager comprises a casing, a stator affixed inside of the casing and comprising a permanent magnet having a plurality of poles, a rotor rotatably mounted on a shaft inside of the casing while facing the stator and provided with a plurality of coils, and a weight buried in part of the rotor.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1A:
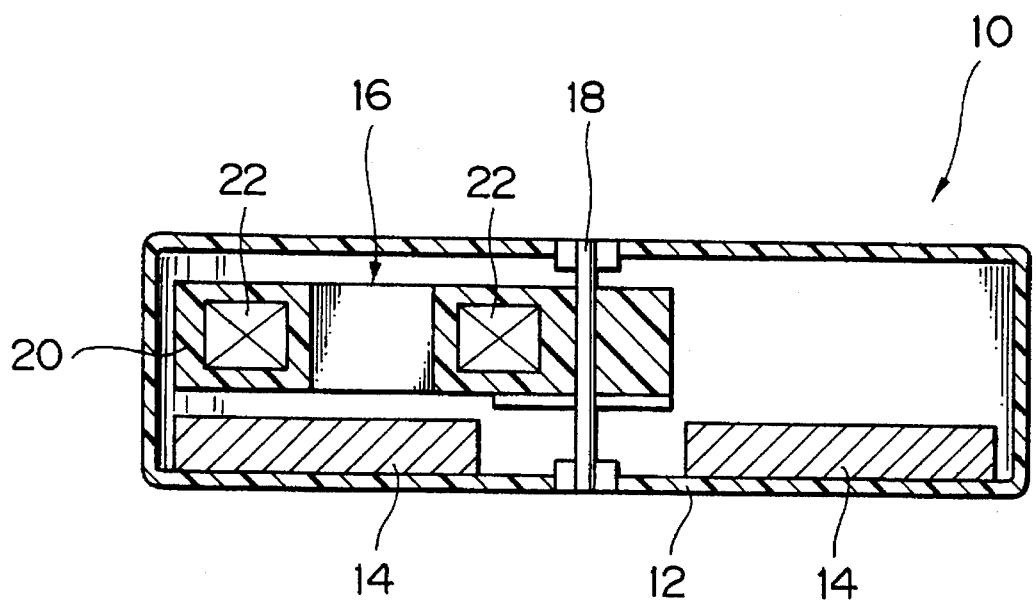
FIG. 1A is a sectional side elevation of a conventional motor for providing a vibrating action.
Figure 1B:
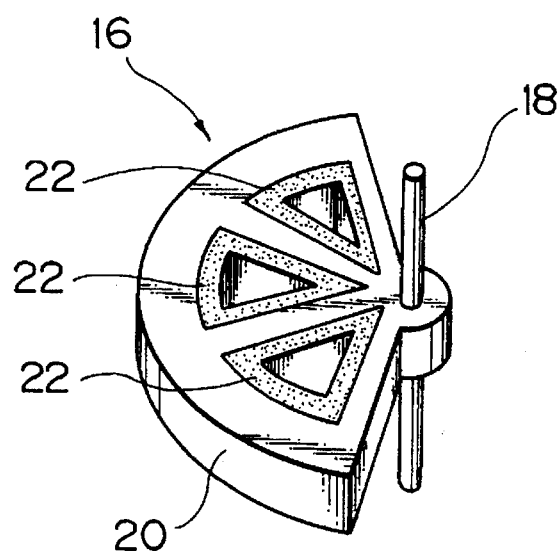
FIG. 1B is a perspective view of a rotor of a rotor assembly included in the conventional motor.

To better understand the present invention, a brief reference will be made to a conventional motor for providing a vibrating action, shown in FIGS. 1A and 1B. As shown, the motor, generally 10, has a casing 12 made of synthetic resin and provided with a cylindrical thin flat configuration having a top and a bottom. A thin annular stator 14 is affixed to the bottom of the casing 12 and constituted by a permanent magnet having a plurality of poles. A rotor assembly 16 is rotatably mounted on a shaft 18 at the center of the casing 12 while facing the stator 14. As best shown in FIG. 1B, the rotor assembly 16 is made up of a rotor 20 implemented as a molding of resin, and a plurality of coils 22 received in the rotor 20 to extend along the circumference. The rotor 20 is partly removed in the circumferential direction, so that the center of gravity thereof is eccentric to the shaft 18. When a current is fed to the coils 22, the eccentric rotor 20 is rotated with the center of gravity sequentially changing. As a result, the motor 10 provides a vibrating action.

As stated above, the rotor assembly 16 is constituted by the coils 22 and the rotor 20 implemented as a molding of resin. This, coupled with the fact that the rotor 20 is partly removed, brings about a problem that the overall weight of the rotor assembly 16 and, therefore, the change in the center of gravity of the motor 10 is small despite the rotation of the rotor 20. As a result, the vibration achievable with the motor 10 is weak. Further, since the rotor 20 is partly removed, the coils 22 cannot be provided over the entire circumference of the rotor 20. Hence, the number of turns available with the coils 20 is limited to in turn limit the torque of the motor 10, further weakening the vibration of the motor 10. In addition, the limited number of turns aggravates the current consumption of the motor 10.

Figure 2A:
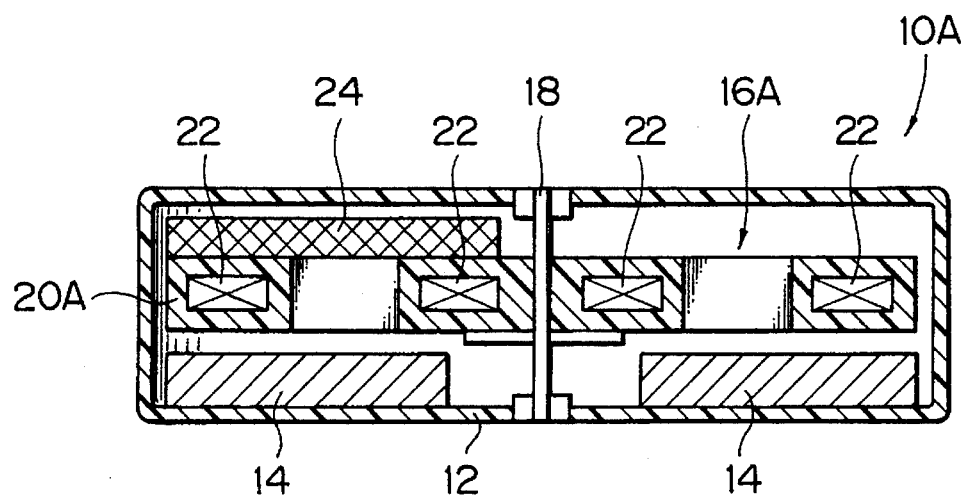
FIG. 2A is a sectional side elevation showing a motor embodying the present invention.
Figure 2B:
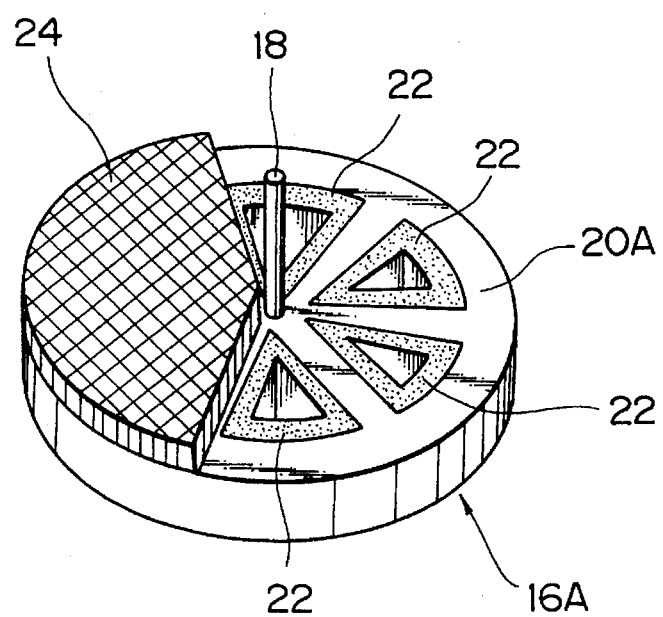
FIG. 2B is a perspective view of a rotor of a rotor assembly included in the embodiment.

Referring to FIGS. 2A and 2B, a motor embodying the present invention is shown. In the figures, the same or similar constituents are designated by like reference numerals, and a detailed description will not be made to avoid redundancy. As shown, the motor, generally 10A, has a rotor assembly 16A including a rotor 20A having a substantially cylindrical flat configuration, i.e., not partly removed. A weight in the form of a flat sectorial plate 24 is affixed to the top of the rotor 20A. The weight 24 is made of a tungsten alloy or similar metal having a great specific gravity. With such a configuration, the rotor assembly 16A has a great mass as a whole and rotates with the center of gravity thereof eccentric to a shaft due to the sectorial shape of the weight 24. The rotor assembly 16A, therefore, generates a sufficient torque due to the great mass and generates intense vibration due to the eccentricity of the center of gravity to the shaft 18.

Further, coils 22 are arranged over the entire circumference of the rotor 20A and, therefore, insure a sufficient number of turns. This further increases the torque of the motor 10A and, in addition, reduces the current consumption by preventing the current to the coils 22A from increasing.

Figure 3A:
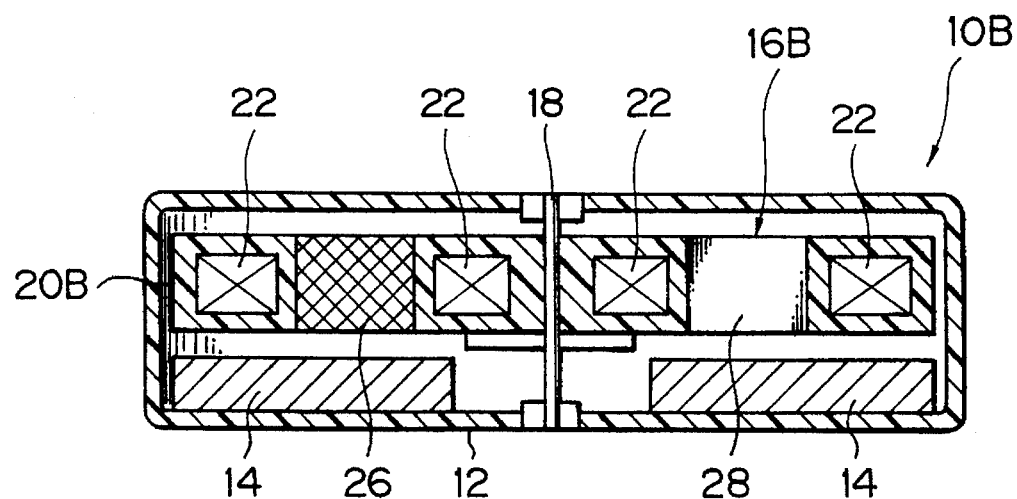
FIG. 3A is a sectional side elevation of an alternative embodiment of the present invention.
Figure 3B:
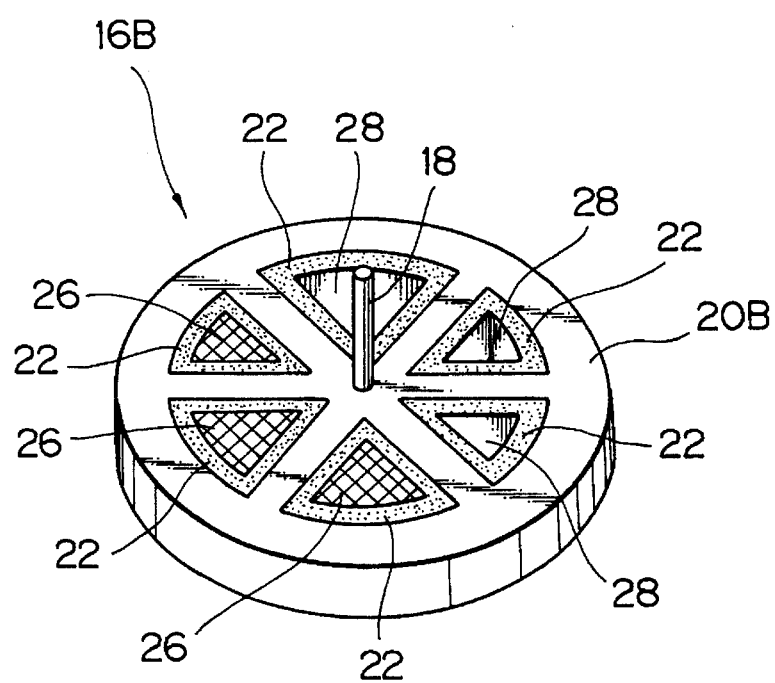
FIG. 3B is a perspective view of a rotor included in the embodiment of FIG. 3A.

FIGS. 3A and 3B show an alternative embodiment of the present invention. As shown, a motor 10B has a rotor 20B formed with a plurality of through bores 28. A weight 26 for providing eccentricity is received in each of three adjoining through bores 28 located on one side. This is also successful in making the center of gravity of the rotor assembly 16B eccentric to the shaft 18 and in increasing the mass of the rotor assembly 16B. Moreover, since the weights 26 are buried in the rotor 20B, they do not increase the thickness of the rotor 20B and, therefore, prevent the overall motor 10B from becoming bulky.

In summary, it will be seen that the present invention provides a motor in which a weight or weights are mounted on part of the surface of a disk-like rotor included in a rotor assembly. The rotor assembly, therefore, has a mass great enough to insure a sufficient motor torque and vibration. Since coils are arranged over the entire circumference of the disk-like rotor, a sufficient number of turns is achievable. This also guarantees a sufficient motor torque and, at the same time, reduces current consumption by preventing the current to the coils from increasing.

Various modifications will become possible for those skilled in the art after receiving the teachings of the present disclosure without departing from the scope thereof.

What is claimed is:

1. A rotor assembly of a motor for providing a vibrating action, comprising:
    a flat cylindrical rotor having coils disposed around the entire periphery thereof and being fixed to and mounted on a shaft which turn as a unit inside of a casing; and
    at least an eccentric weight embedded entirely within said coils and said said rotor.

2. A rotor assembly as claimed in claim 1, wherein said weight is mounted in only a part of a surface of said rotor with respect to a circumferential direction thus causing an eccentric rotation.

3. A rotor assembly as claimed in claim 2, wherein said weight comprises a thin sectorial plate.

4. A rotor assembly as claimed in claim 1, wherein said weight is buried in only a part of said rotor with respect to a circumferential direction.

5. A rotor assembly as claimed in claim 4, wherein said weight comprises a thin sectorial plate.

6. A motor for providing a vibrating action incorporated in a radio pager, comprising:
    a casing;
    a stator affixed inside of said casing and comprising a permanent magnet having a plurality of poles;
    a rotor mounted on and affixed to a shaft rotatably mounted inside of said casing, said rotor facing said stator, said rotor being provided with a plurality of coils which are uniformly arranged around a circumference of said rotor; and
    a weight eccentrically mounted within an arcuate part of said rotor, thereby giving an eccentric rotation having a vibrating action.

7. A motor as claimed in claim 6, wherein said rotor has a cylindrical flat configuration, each of said coils have a hollow center, said weight being mounted in said hollow centers of said coils on only a part of a surface of said rotor with respect to a circumferential direction whereby said rotor rotates with an unbalanced eccentricity.

8. A motor as claimed in claim 7, wherein said weight comprises a thin sectorial plate.

9. A motor for providing a vibrating action incorporated in a radio pager, said motor comprising:
    a casing;
    a stator affixed inside of said casing and comprising a permanent magnet having a plurality of poles;
    a rotor rotatably mounted on a shaft inside of said casing while facing said stator, said rotor being provided with a plurality of coils uniformly distributed around a circumference of said rotor; and
    a weight buried within a sector part of said rotor to cause an eccentric action upon a rotation of said rotor.

10. A motor as claimed in claim 9, wherein said rotor has a cylindrical flat configuration.

11. A motor as claimed in claim 10 wherein said weight comprises a thin sectorial plate.

* * * * *